(12) United States Patent
Yamada et al.

(10) Patent No.: US 6,844,905 B2
(45) Date of Patent: Jan. 18, 2005

(54) ALIGNMENT FILM, METHOD FOR FABRICATING THE ALIGNMENT FILM, LIQUID CRYSTAL DEVICE, AND PROJECTION TYPE DISPLAY DEVICE

(75) Inventors: Shuhei Yamada, Chino (JP); Yutaka Tsuchiya, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/305,985

(22) Filed: Nov. 29, 2002

(65) Prior Publication Data

US 2004/0080685 A1 Apr. 29, 2004

(30) Foreign Application Priority Data

Dec. 3, 2001 (JP) ........................................ 2001-369208
Nov. 21, 2002 (JP) ........................................ 2002-338071

(51) Int. Cl.[7] ........................................... G02F 1/1337
(52) U.S. Cl. ..................... 349/123; 349/124; 349/126; 349/135; 349/5; 428/1.1; 428/1.2; 428/1.26
(58) Field of Search ................................. 349/123, 124, 349/126, 135, 5; 428/1.1, 1.2, 1.26

(56) References Cited

U.S. PATENT DOCUMENTS 5,578,241 A * 11/1996 Plach et al. ............. 252/299.01
5,623,354 A * 4/1997 Lien et al. ................... 349/124
6,001,277 A * 12/1999 Ichimura et al. ......... 252/299.4

* cited by examiner

Primary Examiner—Tarifur R. Chowdhury
Assistant Examiner—George Y. Wang
(74) Attorney, Agent, or Firm—Oliff & Berridge, PLC

(57) ABSTRACT

The invention provides an alignment film that is provided with a high alignment control force to a target molecule and less likely to cause problems to an element during the formation of the alignment film. An alignment film has a configuration in which, on a first alignment layer, a second alignment film layer that is uniform in the in-plane anisotropy more than the first alignment film thereof and aligned along surface alignment of the first alignment film. The first alignment film layer can be formed of, for instance, a polyimide film whose rubbing density is 200 or less, and the second alignment film layer can be formed by use of an ion deposition method with an acryl monomers as a deposition material. A liquid crystal device provided with the alignment film like this becomes higher in the alignment control force to a liquid crystal.

19 Claims, 8 Drawing Sheets

(a)

FIRST ALIGNMENT FILM (b)

SECOND ALIGNMENT FILM (a)

FIRST ALIGNMENT FILM (b)

SECOND ALIGNMENT FILM (a)

(b)

(c)

ALIGNMENT FILM, METHOD FOR FABRICATING THE ALIGNMENT FILM, LIQUID CRYSTAL DEVICE, AND PROJECTION TYPE DISPLAY DEVICE

BACKGROUND OF THE INVENTION

1. Field of Invention

The present invention relates to an alignment film, a method of fabricating the alignment film, a liquid crystal device, and a projection type display device. More particularly, the invention relates to an alignment film that shows an excellent alignment control force to a target molecule thereto alignment properties are endowed.

2. Description of Related Art

A liquid crystal device that is used to modulate light that is mounted on a projection type display device, such as a liquid crystal projector, and a direct view type display device mounted on a portable telephone has a configuration in which, for instance, between two substrates disposed opposite to each other, a liquid crystal layer is interposed. On the liquid crystal layer side of these substrates an electrode for applying a voltage to the liquid crystal layer is formed. In such a liquid crystal device, on outermost surfaces of paired substrates, which are liquid crystal layer sides of the paired substrates, an alignment film is formed for controlling an arrangement of liquid crystal molecules when a voltage is not applied, and a display is implemented based on a change of the arrangement of the liquid crystal molecules from when a voltage is not applied to when a voltage is applied. Such an alignment film like this, one in which a surface of a polyimide film is rubbed with cloth or the like in a predetermined direction, is excellent in a liquid crystal alignment control force (liquid crystal alignment control function), and is widely used. For instance, refer to Japanese Laid Open H3-215832 patent.

SUMMARY OF THE INVENTION

However, in order to endow such polyimide alignment film with a high liquid crystal alignment control force, relatively strong rubbing process is necessary. Specifically, a rubbing density determined according to the number of times of the rubbing, a roller contact length of the rubbing, a roller radius, a rotation number of a roller, a movement speed of a substrate have to be set at a predetermined value or more, and when the rubbing density is tried to make larger, in some cases, occurrence of rubbing streaks, dust, peeling of the alignment film and defects in an element due to static electricity becomes problematic.

Furthermore, other than the alignment film that is prepared by rubbing a polyimide film, an alignment film that is prepared by irradiating a polarized UV light to a polyimide film or a photo-sensitive polymer film from a predetermined direction, an alignment film that is obtained by depositing an inorganic material such as silicon oxide on a substrate by means of an oblique deposition method, an alignment film that is produced by irradiating an ion beam to a film formed by a polyimide film, an inorganic film or a diamond like carbon (DLC) from a predetermined direction, and an inorganic alignment film that is prepared by technique of directional sputtering are known. Since these alignment films do not necessitate the rubbing process, the rubbing streaks such as mentioned above are not caused. However, the liquid crystal alignment control force thereof is inferior to that of the rubbed polyimide film.

An object of the present invention is to provide an alignment film that has a high alignment control force to target molecules and is less likely to cause defects for elements during the formation of the alignment film and a fabricating method thereof, a liquid crystal device equipped with the alignment film, and a projection type display device equipped with the liquid crystal device.

In order to overcome the above problems, an alignment film according to the present invention can be characterized in that the alignment film includes a first alignment film and a second alignment film that is formed on a surface of the first alignment film, and can control alignment of target molecules. The first alignment film, though having in-plane anisotropy in a film surface direction, is relatively non-uniform in an anisotropic direction thereof than the second alignment film. The second alignment film has in-plane anisotropy in a film surface direction that is relatively uniform in an anisotropic direction, more than in the first alignment film and substantially controls alignment of target molecules. A surface side that exhibits alignment properties in the alignment film, that is, a side thereon the target molecule layer is disposed is regarded as a surface side.

The anisotropy in the present invention can be evaluated with, for instance, single crystallinity when an alignment film is observed with a polarizing microscope. For instance, when the respective alignment films are observed with a polarizing microscope, ones in which single crystals are aligned relatively in the same direction can be regarded as relatively uniform ones, and ones in which single crystals are not aligned relatively in the same direction can be regarded as relatively non-uniform ones. Furthermore, the first alignment film and the second alignment film in the invention are specifically regarded as ones that are different in the respective constituent elements, and according to the difference of the constituent elements, these can be differentiated.

In the alignment film according to the invention, the first alignment film is relatively non-uniform in the direction of the anisotropy in comparison with the second alignment film. Accordingly, when only the first alignment film is used (when used as an alignment film without forming the second alignment film), the alignment control force becomes weaker. However, in the alignment film according to the invention, the second alignment film that is relatively uniform in the anisotropy than the first alignment film performs substantial alignment control, accordingly, a sufficient alignment control can be applied to target molecules. Furthermore, when the second alignment film is configured so that the second alignment film itself maybe aligned along an in-plane anisotropy of the first alignment film, the higher alignment control can be exerted to target molecules. Furthermore, when the first alignment film is formed, without applying a processing that tends to damage the film such as strong rubbing, the first alignment film can be formed, under relatively moderate conditions, by endowing a certain degree of anisotropy to the film. In the above, liquid crystal molecules can be used as an example of target molecules, and in this case, the alignment film in the invention functions as a liquid crystal alignment film.

The first alignment film can be a polyimide alignment film that is mainly made of polyimide and has a rubbing density of 200 or less. When, for instance, only a polyimide alignment film having the rubbing density of 200 or less is used as an alignment film without forming the second alignment film, while rubbing streaks, generation of dust, generation of static electricity (hereinafter, these are called as rubbing defects) are less likely to occur in some cases, the alignment control force to the target molecules becomes weaker. However, in the invention, the second alignment film is formed on a surface side of the first alignment film that has the rubbing density of 200 or less, accordingly, with the rubbing defects suppressed, the higher alignment control can be exerted to the target molecules with the second alignment film. In this case, when the second alignment film is configured so as to align itself along the anisotropy direction of the first alignment film, a further higher alignment control force can be endowed.

The first alignment film can be one that is mainly made of a polyimide film or a photosensitive polymer material and in which the anisotropy is given by irradiating an UV light. Other than this, as the first alignment film, an inorganic deposition film mainly formed of silicon oxide, a film that is mainly made of a polyimide film, an inorganic film or diamond like carbon and in which the anisotropy is given by irradiating an ion beam, or an inorganic film that is formed by use of directional sputtering can be adopted. When only one of these films is used as the alignment film (without forming the second alignment film), while, unlike the rubbed polyimide alignment film, the rubbing defects are less likely to occur, in some cases, the alignment control force to the target molecule becomes weaker. However, in the present invention, because the second alignment film that is higher in the alignment control force is formed on a surface side of the first alignment film that is lower in alignment control force. Accordingly, while suppressing rubbing defects, the higher alignment control can be exerted to target molecules with the second alignment film. Also in this case, when the second alignment film is configured so as to align itself along the anisotropic direction of the first alignment film, a further higher alignment control can be exerted.

Subsequently, the second alignment film can be an organic deposition film that is deposited on the first alignment film according to the vapor deposition. The first alignment film of the invention has a predetermined in-plane anisotropy, and when an organic deposition film is formed on the first alignment film having the in-plane anisotropy, the organic deposition film is allowed to align along a surface that has the in-plane anisotropy of the first alignment film. Accordingly, the target molecules can be aligned by the organic deposition film.

The second alignment film can be one that is constituted mainly of a crystalline fluorine-containing polymer. The fluorine-containing polymer is chemically stable and has high crystallinity, and when formed on the first alignment film, the fluorine-containing polymer itself is allowed to align along the in-plane anisotropy of the first alignment film, accordingly, the high alignment control of the target molecules can be performed. When also the crystalline fluorine-containing polymer is deposited on the first alignment film according to the vapor deposition, the alignment control force thereof can be further improved.

Furthermore, as the second alignment film, one that is mainly formed of polyolefin can be adopted. The polyolefin also can be formed with a high alignment control force along a surface that is provided with the in-plane anisotropy of the first alignment film. Accordingly, an alignment film that has a configuration in which an organic alignment film that is mainly made of such polyolefin is formed on the first alignment film can align the target molecules. As the polyolefin, for instance, polyethylene that are strong in the alignment control force can be cited. The polyolefin also, when deposited by means of the vapor deposition on the first alignment film, can further improve the alignment control force thereof.

Furthermore, as the second alignment film, one that is mainly constituted of polymers derived from liquid crystalline monomers that is obtained by polymerizing liquid crystalline monomers can be adopted. In this case, the liquid crystalline monomer denotes one that takes a liquid crystal phase in itself, or one that does not take the liquid crystal phase in itself but does not allow a liquid crystal state of a mixture to be lost when mixed with the liquid crystal phase. Such polymer that is derived from liquid crystalline monomers can align itself along a surface that has the in-plane anisotropy of the first alignment film, accordingly, an alignment film in which such second alignment film can be formed on the first alignment film can highly control the alignment of the target molecule. Furthermore, such polymer that is derived from liquid crystalline monomers can be formed on the first alignment film by depositing the liquid crystalline monomers by use of ion deposition. Specifically, the liquid crystalline monomers are partially ionized and deposited on the first alignment film to promote a polymerization reaction on the first alignment film, and thereby an alignment film containing the polymer that is derived from liquid crystalline monomers can be formed. Accordingly, such second alignment film aligns along a surface of the first alignment film and, based on the alignment, can endow the target molecule with a high alignment control force.

Specifically, the liquid crystalline monomer can be one that is mainly constituted of one or a plurality of compounds that can be expressed by any one of the following general formulas (1), (2) and (3).

$$CH_2\!=\!CHCOO\!-\!X_1\!-\!Y_1 \qquad (1)$$

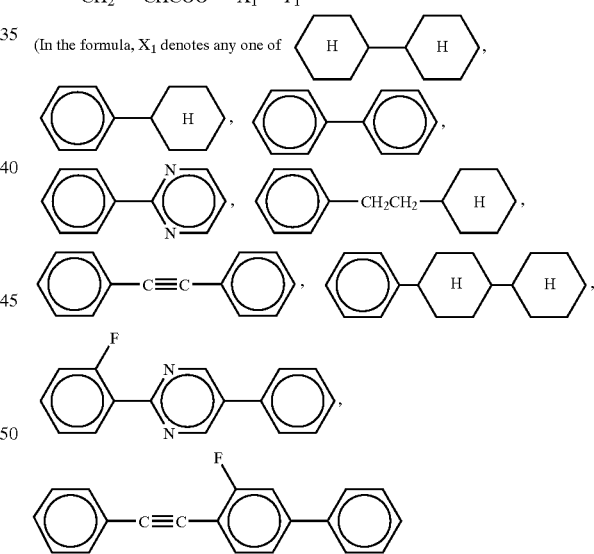

(In the formula, $X_1$ denotes any one of $Y_1$ denotes a group expressed with an alkyl group and a general formula COOR (R denotes an alkyl group), and a group in which at least one hydrogen atom of a benzene ring is substituted with a halogen atom.)

(2)

(In formula (2), X₂ indicates , or

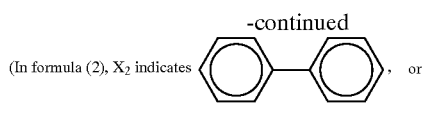, at least one ring that constitutes these in which at least one hydrogen atom has been substituted with a halogen atom. In addition, Y₂ indicates one of a hydrogen atom, a methyl group, a cyano group, and a group represented by a generic formula R or OR (where R is an alkyl group).)

$$CH_2\!\!=\!\!\overset{CH_3}{\underset{|}{C}}OO\!\!-\!\!X_3\!\!-\!\!OCOC\!\!\overset{CH_3}{\underset{|}{=}}\!CH_2 \quad (3)$$

(In the formula (3), X₃ denotes 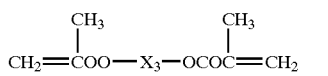 or

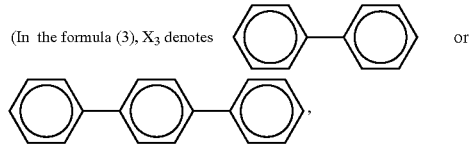, or one in which at least one hydrogen atom of at least one benzene ring that constitutes these is substituted with a halogen atom or a methyl group.)

Each compound expressed by the general formulas (1), (2) and (3) has a rod-like molecular structure and is a monomer that has properties similar to a liquid crystalline monomer or a liquid crystal molecule that forms a liquid crystal phase by itself. Furthermore, when these monomers are deposited on the first alignment film by means of an ion deposition method, a polymerization reaction is allowed to proceed, and the polymer is formed while aligning along a surface that has the in-plane anisotropy of the first alignment film. Moreover, because the compounds expressed by the above general formulas (1), (2) and (3) are acrylate- or methacrylate-based monomers, they are excellent also in polymerization reactivity. Accordingly, when the monomers are deposited on the first alignment film, the monomers spontaneously polymerize and form polymers.

Furthermore, the second alignment film can be one that is mainly constituted of polyalkylacrylates or polyalkylmethacrylates. Specifically, the second alignment film can be one that is mainly constituted of a long chain polyalkylacrylates or polyalkylmethacrylates in which the number of carbons of an alkyl chain is 5 or more. In this case, since the polyalkylacrylates or polyalkylmethacrylates align along the in-plane anisotropy of the first alignment film, an alignment film containing such second alignment film can perform a higher alignment control over target molecules. Furthermore, the polyalkylacrylates or polyalkylmethacrylates can be formed by depositing alkylacrylates or alkylmethacrylates on the first alignment film by means of the ion deposition method, and the second alignment film constituted mainly of such polyalkylacrylates or polyalkylmethacrylates can be formed along a surface that has the in-plane anisotropy of the first alignment film, resulting in exerting higher alignment control over the target molecules.

The alkylacrylates or alkylmethacrylates are expressed by the following general formula (1).

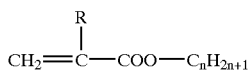

(1)

(In the formula, R denotes a hydrogen or an alkyl group. "n" denotes a natural number and is preferable to be the natural number of 5 or more.)

Subsequently, the alignment film like this according to the invention can be formed according to methods such as mentioned in the following. That is, a method of forming the alignment film of the invention comprises a first alignment film formation step of forming a first alignment film and a second alignment film formation step of forming a second alignment film, wherein in the second alignment film formation step, the second alignment film is formed from an organic material by use of a vapor deposition method. By forming the second alignment film by use of the vapor deposition method, the second alignment film that is aligned along a surface alignment that has an in-plane anisotropy of the first alignment film cart be obtained.

In the first alignment film formation step, for instance, the rubbing processing can be applied to a polyimide film at the rubbing density of 200 or less. The rubbing density can be obtained as follows. That is, when the number of times of the rubbing is "N", a contact length of a rubbing roller is "l", a radius of the roller is "r", a rotation number of the roller is "n", and a movement speed of a rubbing target is "v", the rubbing density "L" can be calculated from L=Nl×(1+2πrn/60v).

As the first alignment film formation step, other than the above, the first alignment film can be formed by irradiating UV light to a polyimide film or a photo-sensitive polymer material, by forming an inorganic material such as silicon oxide by use of an oblique vapor deposition method, and furthermore by irradiating an ion beam from a predetermined direction or by applying a directional sputtering to a diamond like carbon film, a polyimide film or an inorganic film formed by use of a CVD (chemical vapor deposition) method.

In the second alignment film formation step, the second alignment film can be formed also by the ion deposition method using the liquid crystalline monomers as the organic material. In this case, the liquid crystalline monomers are deposited on the first alignment film in a partially ionized state, and polymerization of the monomers spontaneously proceeds on the first alignment film. Accordingly, the second alignment film that is aligned along a surface that has the in-plane anisotropy of the first alignment film can be conveniently obtained.

Furthermore, the alignment film according to the present invention can be provided to a liquid crystal device, That is, a liquid crystal device of the invention is characterized in that the liquid crystal device has a configuration in which between two substrates that face to each other, a liquid crystal layer is interposed, and the above alignment film is disposed on an outermost surface of the liquid crystal layer side of at least one substrate. In this case, since the alignment film according to the invention is formed on the outermost surface of the liquid crystal layer side of the substrate, the liquid crystal device is endowed with a high liquid crystal alignment control force (liquid crystal alignment control function). Accordingly, for instance, occurrence of disclination due to deficiency of the liquid crystal alignment control force can be prevented or suppressed, and when the liquid crystal device is used as a display device, lowering of the contrast due to the occurrence of the disclination can be prevented.

Subsequently, when the liquid crystal device of the invention is provided, the following projection type display device of the present invention can be provided. That is, the projection type display device according to the invention can include a light source, light modulation device constituted of the liquid crystal device of the invention that modulates light from the light source, and projection device for projecting the light modulated by the modulating means. In this case, since the light modulation device is configured to contain a liquid crystal device that is endowed with a high liquid crystal alignment control force (liquid crystal alignment control function), for instance, the disclination caused by deficiency of the liquid crystal alignment control force can be prevented or suppressed. Furthermore, for instance, when the liquid crystal device that constitutes the light modulation device is configured with only a rubbed polyimide film as the alignment film, the polyimide film may be deteriorated due to light or heat, resulting in display defects of the projection type display device. However, since the projection type display device according to the invention is provided with the liquid crystal device according to the invention, even when a rubbed polyimide film, for instance, is used as the first alignment film, the alignment film is less likely to deteriorate by light or heat since the second alignment film is formed on a surface side of the first alignment film. Accordingly the display defects are less likely to occur, that is, display quality can be maintained over a long period of time.

In the present specification, a "main" component denotes a component that is contained most among the constituents,

BRIEF DESCRIPTION OF THE DRAWINGS

The invention will be described with reference to the accompanying drawings, wherein like numerals reference like elements and wherein.

DETAILED DESCRIPTION OF PREFERRED EMBODIMENTS

In the following, embodiments involving the invention will be explained with reference to the drawings. A liquid crystal device according to the present embodiment, shown in the following, is an active matrix type transmissive liquid crystal device in which a TFT (Thin Film Transistor) element is used as a switching element. Furthermore, the liquid crystal device according to the embodiment comprises an alignment film of the invention and a structure of the alignment film is particularly characteristic.

Figure 1:
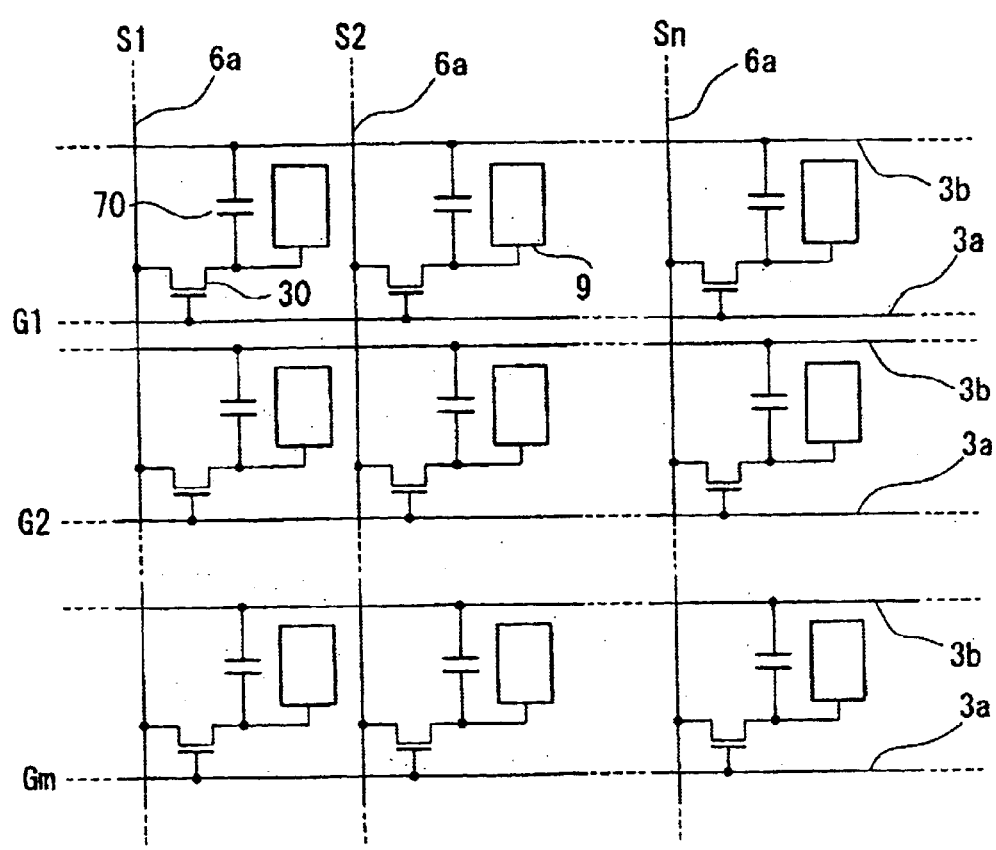
FIG. 1 is an equivalent circuit diagram of switching elements, signal lines and so on in a liquid crystal device that is one embodiment of the invention.
Figure 2:
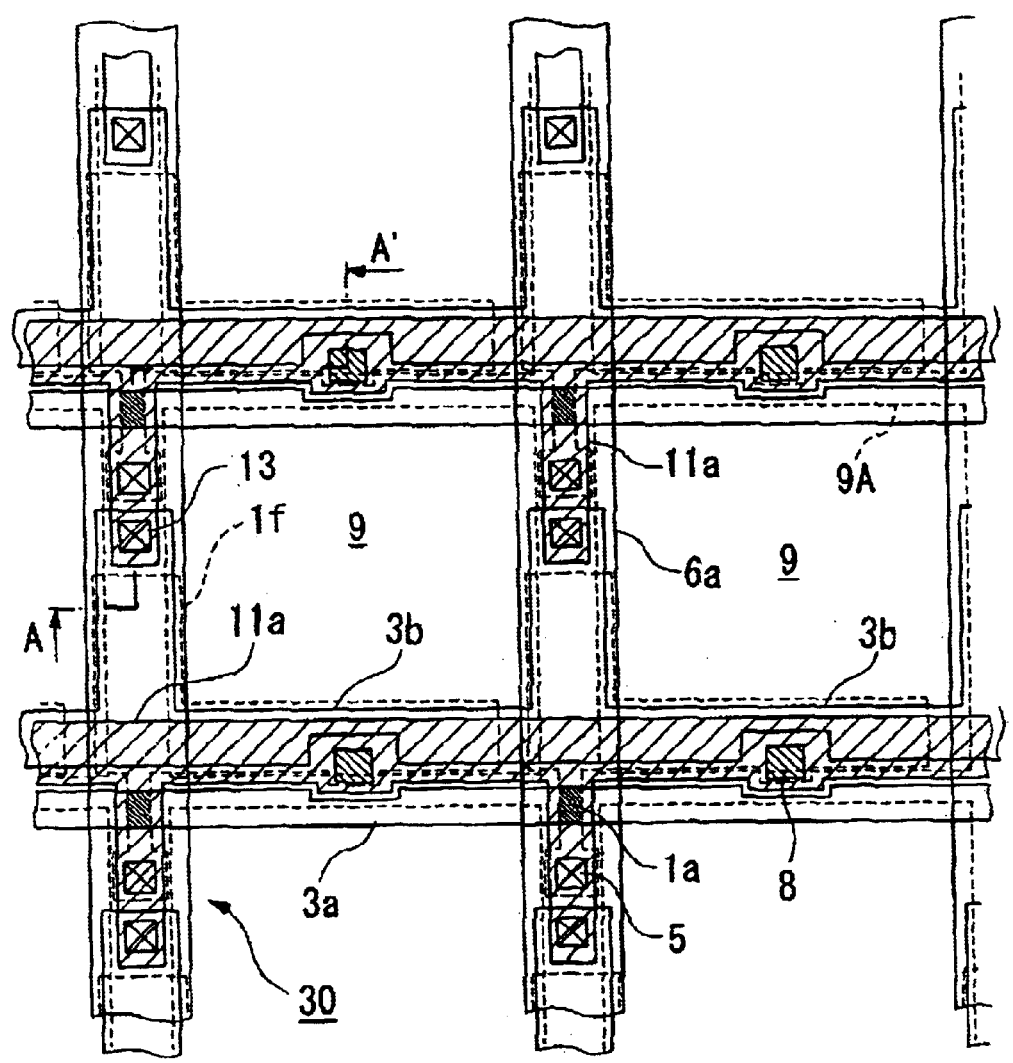
FIG. 2 is a plan view showing a structure of a plurality of adjacent pixel groups of a TFT array substrate of the liquid crystal device of FIG. 1.
Figure 3:
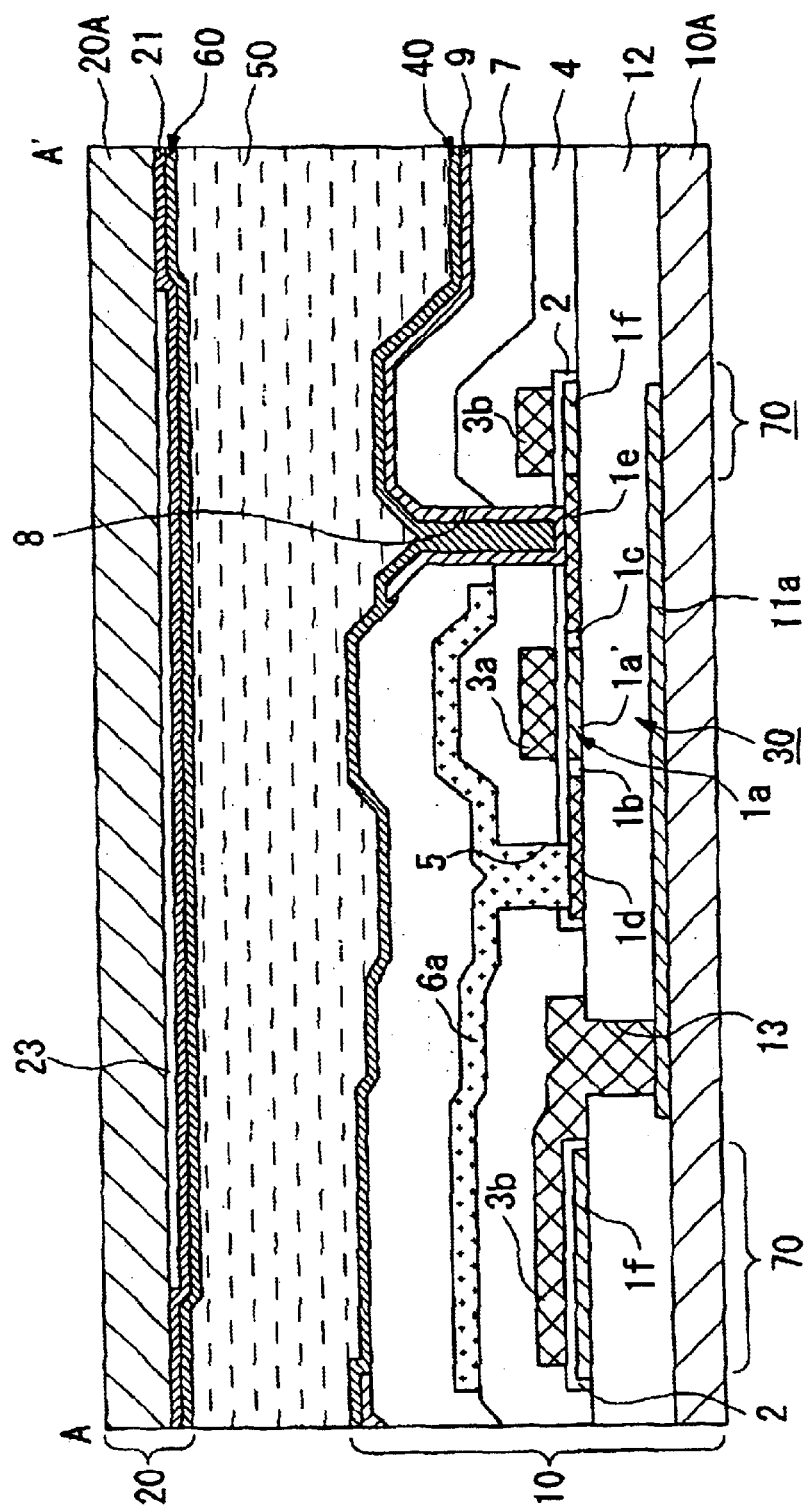
FIG. 3 is a sectional view showing a structure of an essential portion of the liquid crystal device of FIG. 1.
Figure 4:
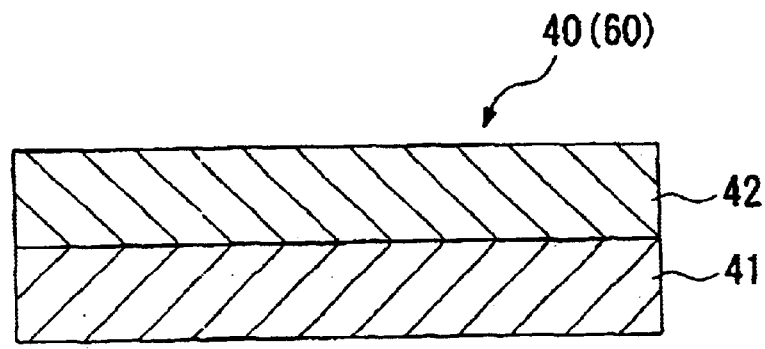
FIG. 4 is an enlarged sectional view showing a structure of an alignment film provided to the liquid crystal device of FIG. 1.

FIG. 1 is an equivalent circuit diagram of switching elements, signal lines and others in a plurality of matrix-like disposed pixels that constitute an image display region of a transmissive liquid crystal device of the embodiment. FIG. 2 is a plan view showing a structure of a plurality of adjacent pixel groups of a TFT array substrate thereon data lines, scanning lines and pixel electrodes are formed. FIG. 3 is a sectional view showing a structure of a transmissive liquid crystal device according to the embodiment, and is an A—A' line sectional view of FIG. 2. FIG. 4 is a partially enlarged sectional view showing an alignment film provided to the transmissive liquid crystal device according to the embodiment, In FIG. 3, a case where an upper side in the drawing is a light incidence side, and a lower side in the drawing is a visual side (observer side) is shown. Furthermore, in each drawing, in order to enlarge the respective layers and members to an extent that is recognizable, a scale is differentiated for each of the layers and members.

In the transmissive liquid crystal device according to the embodiment, as shown in FIG. 1, in each of a plurality of matrix-like disposed pixels that constitutes an image display region, a pixel electrode 9 and a TFT element 30 that is a switching element for controlling an electrical energization to the pixel electrode 9 are formed, and a data line 6a thereto an image signal is supplied is electrically connected to a source of the TFT element 30. Image signals S1, S2, . . . , Sn being written in the data line 6a may be line sequentially supplied in this order, or, may be supplied group by group to a plurality of adjacent data lines 6a.

Furthermore, a scanning line 3a is electrically connected to a gate of the TFT element 30, and scanning signals G1, G2, . . . , Gm are line sequentially supplied in pulse at predetermined timings to a plurality of scanning lines 3a. The pixel electrode 9 is electrically connected to a drain of the TFT element 30, and by turning on the TFT element 30 that is a switching element for a definite time period, the image signals S1, S2, . . . , Sn that are supplied from the data line 6a are written in at predetermined timings.

The image signals S1, S2, . . . , Sn that are written through the pixel electrode 9 into a liquid crystal and have a predetermined level are retained between common electrodes described later for a definite period of time. The liquid crystal is allowed to change an alignment and order of molecular aggregates according to an applied voltage level, thereby modulating light, resulting in gradation display. In order to prevent the retained image signal from leaking, in parallel with a liquid crystal capacitance formed between the pixel electrode 9 and the common electrode, a storage capacitance 70 is added.

In the next place, based on FIG. 2, a planar structure of a transmissive liquid crystal device according to the embodiment will be explained. As shown in FIG. 2, on a TFT array substrate, a plurality of rectangular pixel electrodes 9 (a contour is shown with a dotted line portion 9A) that is made of a transparent conductive material such as indium tin oxide (hereinafter abbreviated as "ITO") is disposed in matrix, and along vertical and horizontal boundaries of each of the pixel electrodes 9, the data line 6a, the scanning line 3a and a capacitance line 3b are disposed, respectively. In the embodiment, a pixel region is formed from an individual pixel electrode 9, and a data line 6a, a scanning line 3a and a capacitance line 3b that are formed so as to surround the individual pixel electrode 9, and each of the pixels disposed in matrix is allowed to display.

The data line 6a can be electrically connected through a contact hole 5 to a source region, which is described later, of a semiconductor layer 1a made of, for instance, a polysilicon film that constitutes the TFT element 30, and the pixel electrode 9 is electrically connected through a contact hole 8 to a drain region, which is described later, of the semiconductor layer 1a. Furthermore, so as to face a channel region (a region of oblique lines (upper-left to lower-right), which is described later, of the semiconductor layer 1a, the scanning line 3a is disposed and functions as a gate electrode at a portion that faces the channel region.

The capacitance line 3b has a main line portion (that is, a first region that is formed two-dimensionally along the scanning line 3a) that extends substantially in straight line along the scanning line 3a, and a projection portion (that is, a second region that extends two-dimensionally along the data line 6a) that projects toward a previous part side (upward in the drawing) along the data line 6a from an intersecting place with the data line 6a. In regions shown with oblique lines (lower-left to upper-right) in FIG. 2, a plurality of first light shielding films 11a is disposed.

In the next place, based on FIG. 3, a sectional structure of the transmissive liquid crystal device according to the embodiment will be explained. As shown in FIG. 3, in the transmissive liquid crystal device according to the embodiment, a liquid crystal layer 50 is interposed between a TFT array substrate 10 and an opposite substrate 20 disposed oppositely. The TFT array substrate 10 is mainly constituted of a substrate body 10A made of a transparent material such as quartz, and a TFT element 30, a pixel electrode 9 and an alignment film 40 that are formed on a surface of the substrate body 10A, which is the liquid crystal layer 50 side of the substrate body 10A, and the opposite substrate 20 is mainly constituted of a substrate body 20A made of a transparent material such as glass or quartz, and a common electrode 21 and an alignment film 60 that are formed on a surface of the substrate body 20A, which is the liquid crystal layer 50 side of the substrate body 20A.

In the TFT array substrate 10, on a surface of the substrate body 10A, which is the liquid crystal layer 50 side of the substrate body 10A, the pixel electrodes 9 are disposed, and at a position adjacent to each of the pixel electrodes 9, a pixel switching TFT element 30 is disposed to switching control each of the pixel electrodes 9. The pixel switching TFT element 30 has an LDD (Lightly Doped Drain) structure and includes a scanning line 3a, a channel region 1a' of a semiconductor layer 1a therein a channel is formed due to an electric field from the scanning line 3a, a gate insulating film 2 that isolates the scanning line 3a from the semiconductor layer 1a, a data line 6a, a low concentration source region 1b and a low concentration drain region 1c of the semiconductor layer 1a, and a high concentration source region 1d and a high concentration drain region 1e of the semiconductor layer 1a.

Above the substrate body 10A, including above the scanning line 3a and above the gate insulating film 2, a second interlayer insulating film 4 is formed, in which a contact hole 5 that connects to the high concentration source region 1d and a contact hole 8 that connects to the high concentration drain region 1e are bored. That is, the data line 6a is electrically connected to the high concentration source region 1d through the contact hole 5 that penetrates through the second interlayer insulating film 4. Furthermore, above the data line 6a and the second interlayer insulating film 4, a third interlayer insulating film 7 is formed, in which the contact hole 8 that connects to the high concentration drain region 1e is bored. That is, the high concentration drain region 1e is electrically connected to the pixel electrode 9 through the contact hole 8 that penetrates through the second interlayer insulating film 4 and the third interlayer insulating film 7.

In the embodiment, the gate insulating film 2 is extended from a position that faces the scanning line 3a to use as a dielectric film, the semiconductor film 1a is extended as a first storage capacitance electrode 1f, and furthermore part of the capacitance line 3b that faces these is used as a second storage capacitance electrode, and thereby a storage capacitance 70 can be formed.

Furthermore, on a surface of substrate body 10A, which is the liquid crystal layer 50 side of the substrate body 10A of the TFT array substrate 10, a first light shielding film 11a is disposed in a region where an individual pixel switching TFT element 30 is formed, in order to block a return light, which returns to the liquid crystal layer 50 side after transmitting the TFT array substrate 10 and reflected at a bottom surface in the drawing of the TFT array substrate 10 (an interface between the TFT array substrate 10 and air), from entering at least the channel region 1a' and the low concentration source and drain regions 1b and 1c of the semiconductor layer 1a. Furthermore, between the first light shielding film 11a and the pixel switching TFT element 30, in order to electrically isolate the semiconductor layer 1a that constitutes the pixel switching TFT element 30 from the first light shielding film 11a, a first interlayer insulating film 12 is disposed. Furthermore, as shown in FIG. 2, in addition to the disposition of the first light shielding film 11a to the TFT array substrate 10, the first light shielding film 11a is configured so as to be electrically connected to a previous or subsequent capacitance line 3b through a contact hole 13.

Furthermore, on an outermost surface of the TFT array substrate 10, which is the liquid crystal layer 50 side of the TFT array substrate 10, that is, above the pixel electrode 9 and the third interlayer insulating film 7, an alignment film 40 is formed, which controls the alignment of a liquid crystal molecule in the liquid crystal layer 50 when a voltage is not applied.

On the other hand, on the opposite substrate 20, on a surface side of the substrate body 20A, which is the liquid crystal layer 50 side of a substrate body 20A, a second light shielding film 23 is disposed in a region that faces a formation region of the data line 6a, scanning line 3a and pixel switching TFT element 30, that is, in a region other than an opening region of the individual pixel portion, in order to block an incident light from entering the channel region 1a', the low concentration source region 1b and the low concentration drain region 1c of the semiconductor layer 1a of the pixel switching TFT element 30. Furthermore, on the liquid crystal layer 50 side of the substrate body 20A, the second light shielding film 23 is formed, and a common electrode 21 made of ITO is formed over a substantially entire surface thereof, and on the liquid crystal layer 50 side thereof, an alignment film 60, which controls the alignment of a liquid crystal molecule in the liquid crystal layer 50 when a voltage is not applied, is formed.

As mentioned above, in the embodiment, the alignment films 40 and 60 are particularly characteristically structured. In the following, based on FIG. 4, a structure of the alignment films 40 and 60 and a method of forming the same will be explained. FIG. 4 is a partial sectional view showing the alignment film 40 (60) in enlargement, and an upper side in the drawing denotes a side that comes into contact with the liquid crystal layer 50. Furthermore, in the embodiment, the alignment film 40 on the side of the TFT array substrate 10 and the alignment film 60 on the side of the opposite substrate 20 have the same structure, As shown in FIG. 4, the alignment film 40 (60) can include a first alignment film layer 41 that is positioned on a side opposite to the liquid crystal layer 50 and a second alignment film layer 42 that is formed on the first alignment film layer 41 and positioned on a the liquid crystal layer 50 side of the alignment film 40 (60). In the embodiment, the first alignment film layer 41 is mainly constituted of a polyimide alignment film having a rubbing density of 200 or less and the second alignment film layer 42 is a polymer film thinly formed by a technique of an ion deposition method with acrylic monomers (including methacrylic monomers), specifically mainly composed of a polymer film that is obtained by depositing by means of a ion deposition method and by polymerizing monomers shown in the following general formulas (1), (2), (3) and (4), which can form a liquid crystal phase, or monomers that do not allow to lose a liquid crystal state by an addition of itself to a liquid crystal phase, or long chain alkyl acrylic monomers (long chain alkyl methacrylic monomers).

(1)

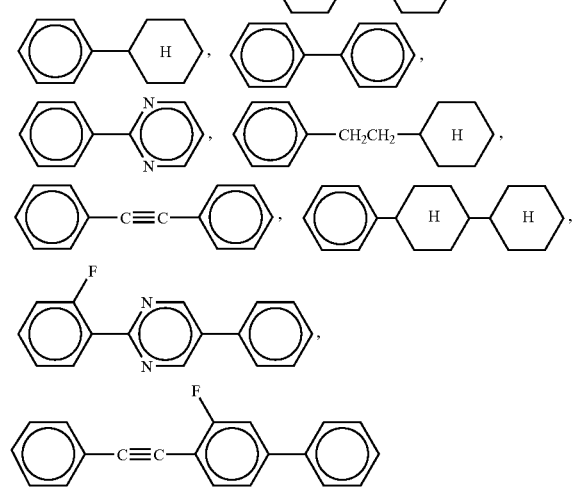

$Y_1$ denotes a group expressed with an alkyl group and a general formula COOR (R denotes an alkyl group), and a group in which at least one hydrogen atom of a benzene ring is substituted with a halogen atom.)

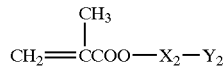

(2)

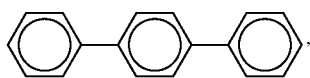

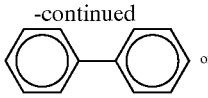

or one in which at least one hydrogen atom of at least one benzene ring that constitutes these is substituted with a halogen atom. $Y_2$ denotes any one of a hydrogen atom, a methyl group, a cyano group, and a group that is expressed with general formulas R and OR (R denotes an alkyl group).)

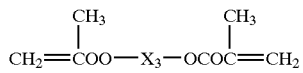

(3)

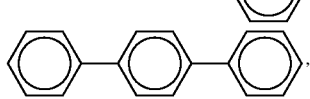

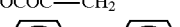

or one in which at least one hydrogen atom of at least one benzene ring that constitutes these is substituted with a halogen atom or a methyl group.)

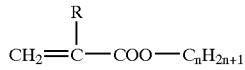

(4)

(In the formula, R denotes a hydrogen or an alkyl group. "n" denotes a natural number and is preferable to be a natural number of 5 or more.)

In the embodiment, the first alignment film layer 41, though having the in-plane anisotropy, is formed in a low alignment film layer in which a direction of the anisotropy is relatively non-uniform in comparison with the second alignment film layer 42. On the other hand, the second alignment film layer 42 is deposited while aligning along a direction of the anisotropy of the first alignment film layer 41 and becomes a high alignment film layer in which a direction of the anisotropy is relatively uniform in comparison with the first alignment film layer 41 due to its high crystallinity (alignment properties).

Figure 7:
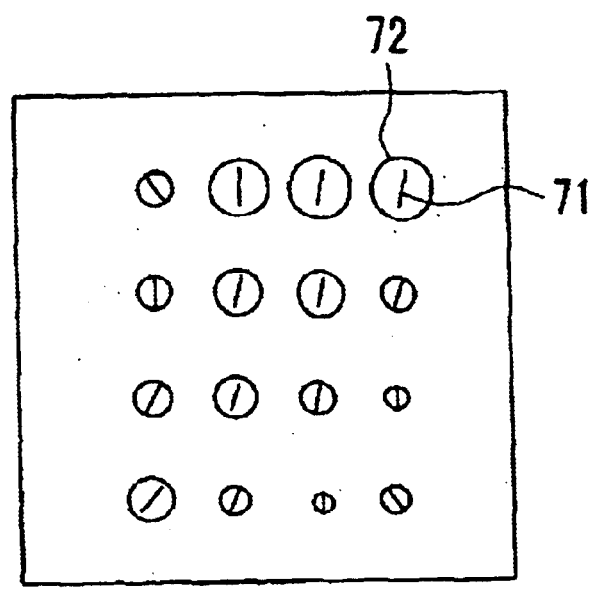
FIGS. 7A and 7B are explanatory diagrams schematically showing in-plane anisotropy in a film surface direction in a first alignment film layer and a second alignment film layer.
Figure 7:
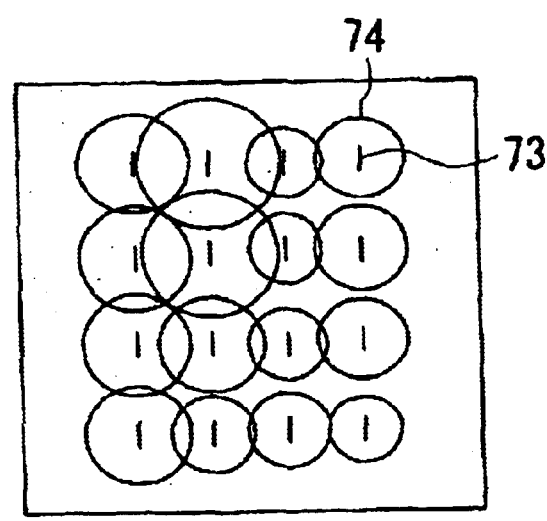

FIGS. 7A and 7B are explanatory diagrams schematically showing results of observations of the in-plane anisotropy in a film surface direction in the first alignment film layer 41 and the second alignment film layer 42, obtained by a polarizing microscope. Directions, shown by solid lines with reference numerals 71 and 73 in the drawing, show directions of the anisotropy, and magnitudes of circles shown with reference numerals 72 and 74 denote magnitudes of the anisotropy. Thus, in the first alignment film layer 41 of FIG. 7A, the directions of the anisotropy are regarded non-uniform and the anisotropy thereof is regarded smaller in comparison with the second alignment film layer 42 shown in FIG. 7B, whereas in the second alignment film layer 42 of FIG. 7B, the directions of the anisotropy are uniform and moreover the anisotropy is regarded larger.

Accordingly, the second alignment film layer 42, due to an aligned surface shape thereof and an intermolecular interaction between constituent organic molecules and liquid crystal molecules of the liquid crystal layer 50, can exhibit a higher liquid crystal alignment control function. In this case, the first alignment film layer 41 functions as a directional alignment film of the second alignment film layer 42 and does not substantially control the alignment of the liquid crystal molecules of the liquid crystal layer 50. In contrast, the second alignment film layer 42 is a higher alignment property layer in which the second alignment film layer 42 itself aligns based on the anisotropy of the first alignment film layer 41 and has a function of substantially controlling the alignment of liquid crystal molecules of the liquid crystal layer 50.

A method of forming the alignment film 40 (60) as mentioned above can include a first alignment film layer formation process, and a second alignment film layer formation process applied after the first process. Specifically, a pre-substrate, in which a light shielding film, a first interlayer insulating film, a semiconductor layer, a channel region, a low concentration source region, a low concentration drain region, a high concentration source region, a high concentration drain region, a storage capacitance electrode, an insulating thin film, a scanning line, a capacitance line, a second interlayer insulating film, a data line, a third interlayer insulating film, a contact hole, and a pixel electrode are formed on a transparent substrate made of quartz by a method similar to an existing method (for instance, photolithography), is prepared, and the alignment film 40 (60) is formed on the, pre-substrate.

Specifically, to a surface of the pre-substrate thereon the pixel electrode and others are formed, the first alignment film layer formation process is first applied. In the embodiment, a polyimide film is formed by coating followed by drying, and further followed by applying an operation of rubbing a surface of the polyimide film in one direction (rubbing) with a roller made of soft cloth while transferring it in a predetermined direction, and thereby a polyimide alignment film as the first alignment film is formed, In the embodiment, in order to avoid degradation of the alignment film due to an excessive rubbing, the rubbing is applied by setting a value of the rubbing density at 200 or less. The rubbing density "L" is a value that can be calculated based on $Nl\times(1+2\pi rn/60v)$ when the number of times of the rubbing is "N", a contact length of a rubbing roller is "l", a radius of the roller is "r", a rotation number of the roller is "n", and a movement speed of a rubbing target is "v". By setting the rubbing density at 200 or less, the rubbing streaks, dust, peeling of the alignment film, and the static electricity due to the excessive rubbing can be prevented or suppressed, and thereby a polyimide film relatively low in the alignment can be formed.

Figure 5:
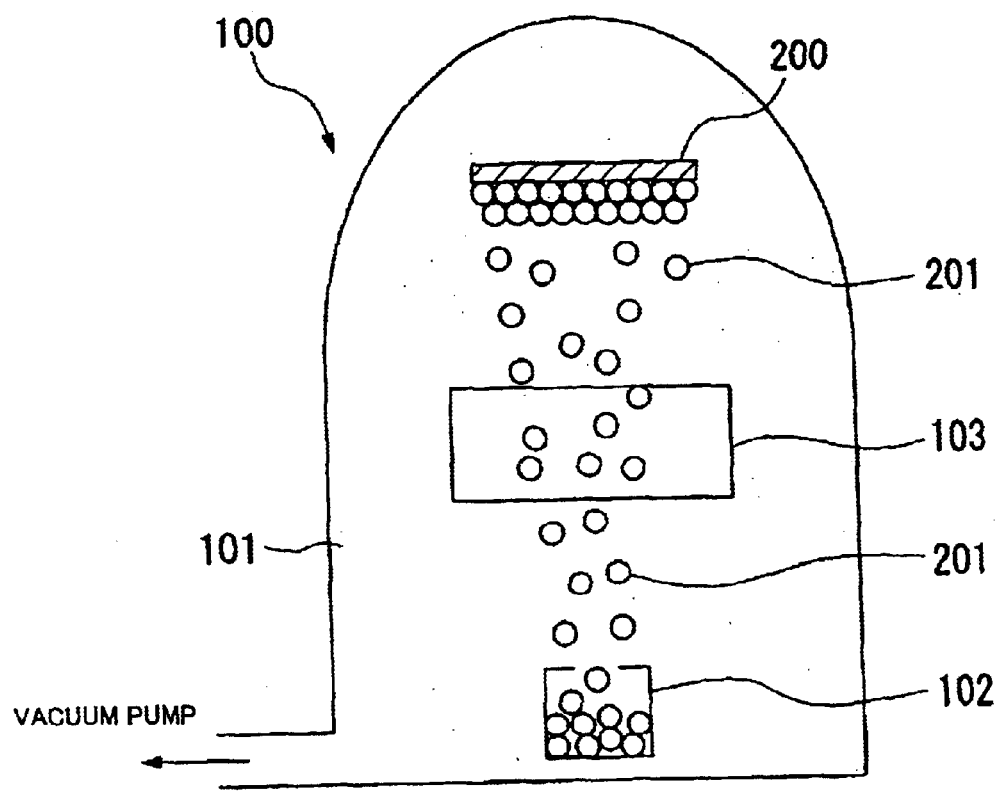
FIG. 5 is a diagram schematically showing a configuration of ionization deposition apparatus.

Subsequently in the second alignment film layer formation process, in the embodiment, the second alignment film layer 42 is formed by use of an ion deposition method. FIG. 5 is a diagram schematically showing a structure of ion deposition apparatus 100. The ion deposition apparatus 100 is provided with a deposition chamber 101 that is connected to a vacuum pump and the inside of which can be evacuated (vacuum state), and at a lower part of the inside of the deposition chamber 101, a deposition material container 102, in which a deposition material 201, such as acrylic monomers expressed by the general formulas (1) through (4) shown by chemical formulas 8 through 11 is input, is disposed, and above the container 102, it is configured so as to dispose the pre-substrate 200 on which the first alignment film is formed. The side of the pre-substrate 200, where the first alignment film is formed, is disposed and directed toward the container 102.

The deposition material 201 in the deposition material container 102 is heated and vaporized (volatilized), and the vaporized deposition material 201 is guided upward in the drawing and partially ionized when passing through an ionization portion 103. Furthermore, between the ionization portion 103 and a substrate 200 to be deposited, an electric field is applied, and the ionized deposition material 201 is accelerated by the electric field and deposited on the substrate to be deposited. In the ionization portion 103, by applying a voltage to the deposition material 201, the deposition material 201 can be ionized.

That is, in the ion deposition method, the deposition material 201, after being vaporized, is partially ionized, and the ionized deposition material 201 is accelerated and deposited on the pre-substrate 200. According to the method, by controlling ionization conditions at the ionization portion 103 and accelerating conditions of the ionized deposition material 201, the deposition of the deposition material 201 to the pre-substrate 200 (in detail, the first alignment film layer on the pre-substrate 200) can be controlled. Accordingly, in comparison with other deposition methods, the deposition conditions of the deposition material 201 to the substrate 200 to be deposited can be easily controlled. Thus, in the ion deposition method, since the deposition conditions can be easily controlled, an organic deposition film (the second alignment film) can be formed along a surface alignment of the first alignment film layer.

As the deposition material, acryl monomers expressed by the general formulas (1) through (4) are used, and after the acryl monomers are vaporized and followed by partial ionization, the ionized monomers are deposited on the first alignment film layer. Since the ionized monomers are high in activity, the polymerization reaction of the monomers deposited on the first alignment film layer spontaneously proceeds to polymerize, and thereby the second alignment film mainly constituted of polymers obtained by polymerizing the monomers expressed by the above general formulas (1) through (4) can be formed.

Furthermore, the acryl monomers expressed by the general formulas (1) through (3) are regarded liquid crystalline monomers that show a liquid crystal phase or do not allow losing a liquid crystal phase when added to the liquid crystal phase. These liquid crystalline monomers are deposited while aligning along a surface alignment of the first alignment film layer followed by polymerizing, accordingly the second alignment film layer 42 that is provided with the anisotropy in an alignment direction of the first alignment film layer can be formed. As a result, the alignment properties of an organic polymer that constitutes the formed second alignment film layer 42 can be made higher in comparison with the case where a monomer that does not exhibits the liquid crystalline properties is used. Accordingly, an intermolecular interaction between the organic polymers that constitutes the second alignment film layer and the liquid crystal molecules can be made higher, resulting in forming the second alignment film layer more excellent in the liquid crystal alignment control function.

As for compounds expressed by the general formula (1), specifically, compounds M1 through M25 (UV curable liquid crystals manufactured by Lodic Co., Ltd,) shown in Table 1 or 2 can be cited, Furthermore, as for compounds expressed by the general formula (2), specifically, compounds M26 through M33 and M38 through M45 shown in Table 3 or 5 can be cited. Still furthermore, as for compounds expressed by the general formula (3), specifically, compounds M34 through M37 and M46 through M51 shown in Table 4 or 6 can be cited.

| No. | Structural Formula |
|---|---|
| M1 | 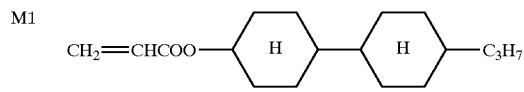 |
| M2 | 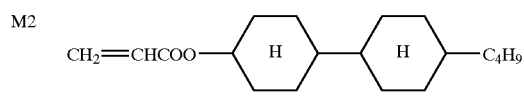 |
| M3 | 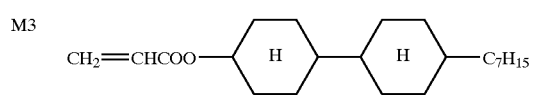 |
| M4 | 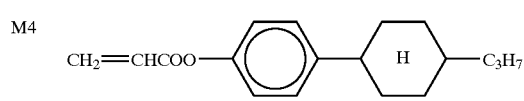 |
| M5 | 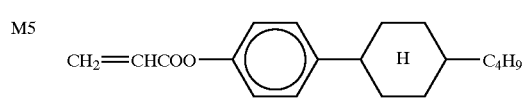 |
| M6 | 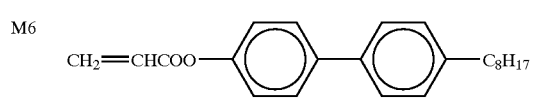 |
| M7 | 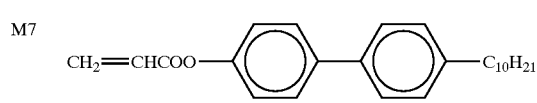 |
| M8 | 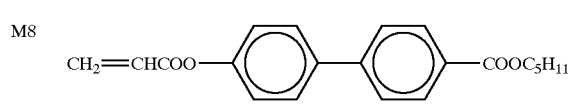 |
| M9 | 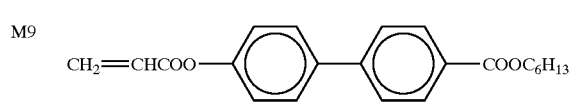 |
| M10 | 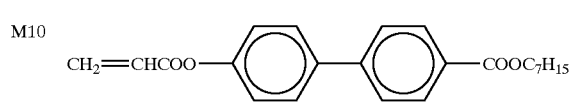 |
| M11 | 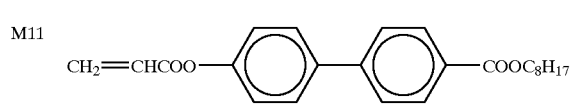 |
| M12 | 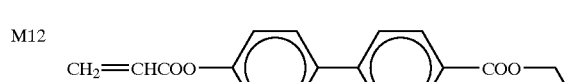 |
| M13 | 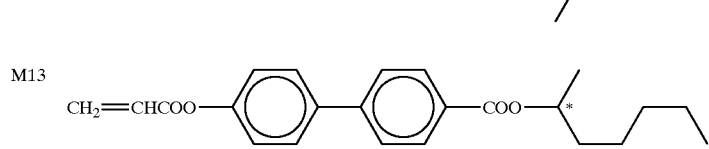 |

| No. | Structural Formula |
|---|---|
| M14 | 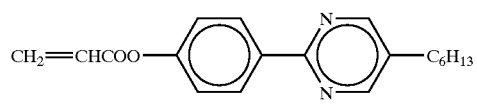 |
| M15 | 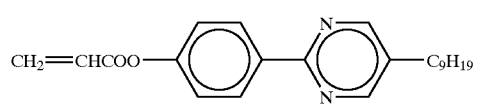 |
| M16 | 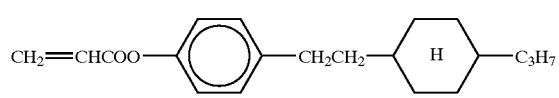 |
| M17 | 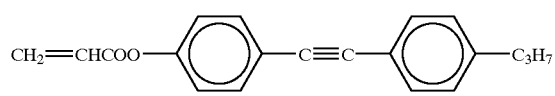 |
| M18 | 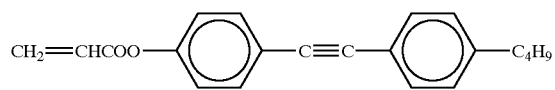 |
| M19 | 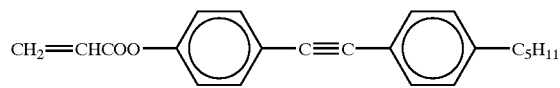 |
| M20 | 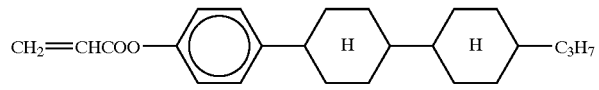 |
| M21 | 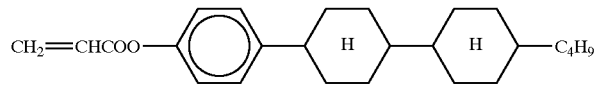 |
| M22 | 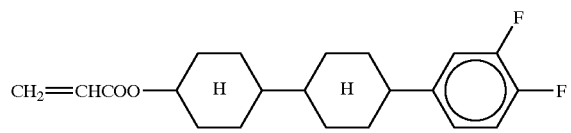 |
| M23 | 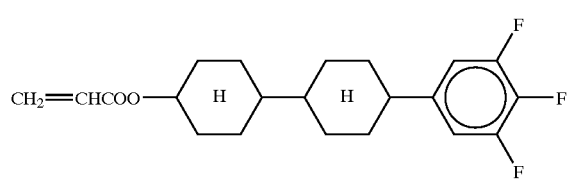 |
| M24 | 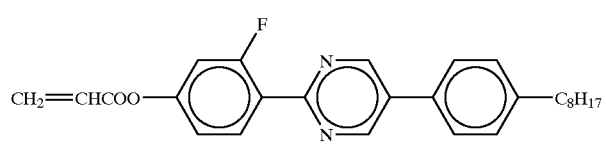 |
| M25 | 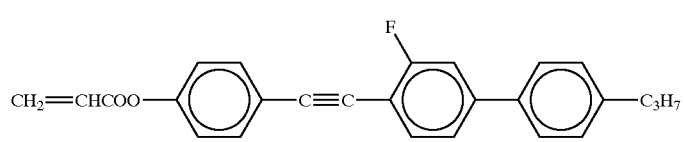 |

| No. | Structural Formula |
|---|---|
| M26 | 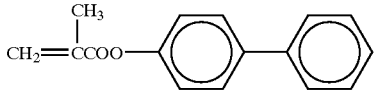 |
| M27 | 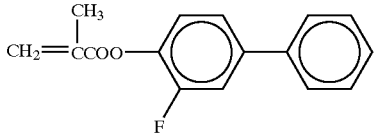 |
| M28 | 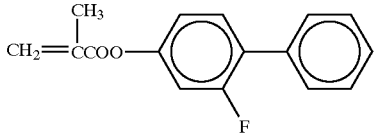 |
| M29 | 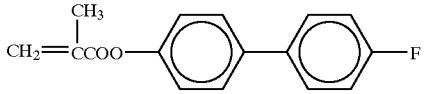 |
| M30 | 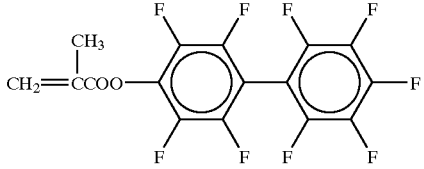 |
| M31 | 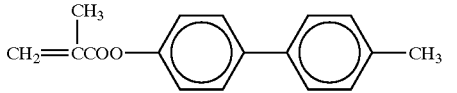 |
| M32 | 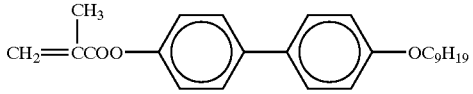 |
-continued
| No. | Structural Formula |
|---|---|
| M33 | 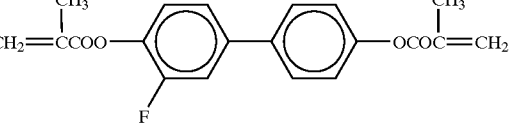 |
| No. | Structural Formula |
|---|---|
| M34 | 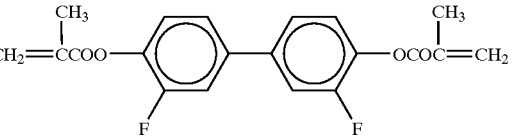 |
| M35 | 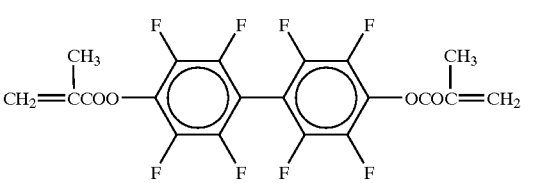 |
| M36 | 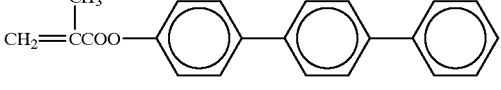 |
| M37 | 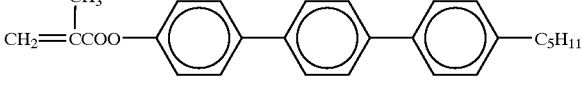 |
| No. | Structural Formula |
|---|---|
| M38 | 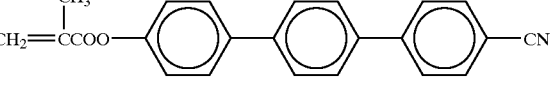 |
| M39 | |
| M40 | |

| No. | Structural Formula |
|---|---|
| M41 | 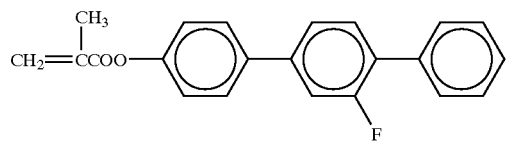 |
| M42 | 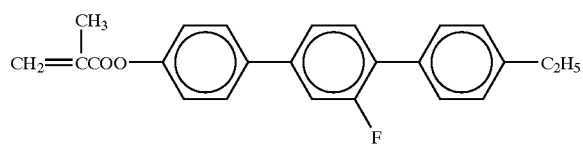 |
| M43 | 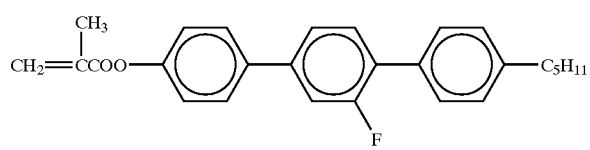 |
| M44 | 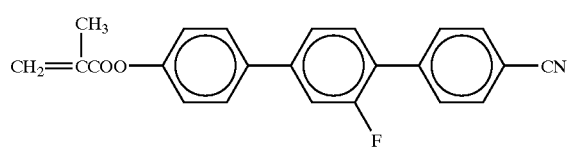 |
| M45 | 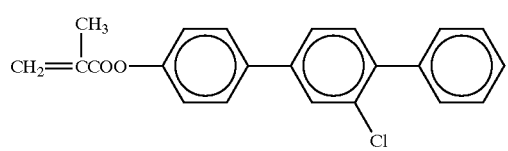 |
| No. | Structural Formula |
|---|---|
| M46 |  |
| M47 | 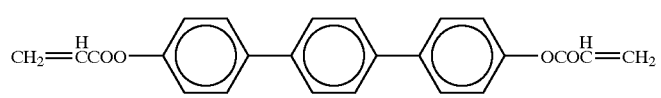 |
| M48 | 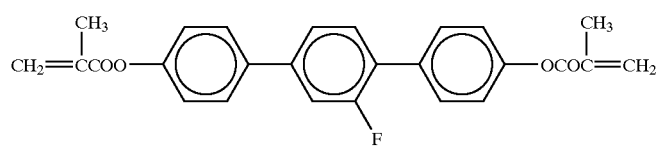 |
| M49 | 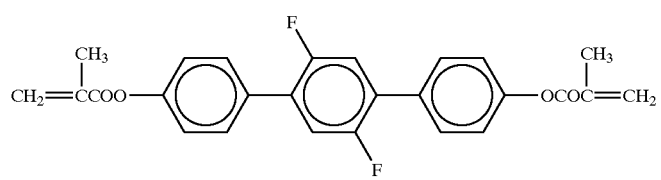 |

-continued

| No. | Structural Formula |
|---|---|
| M50 | CH₂=C(CH₃)COO—⌬—⌬(Cl)—⌬—OCOC(CH₃)=CH₂ |
| M51 | CH₂=C(CH₃)COO—⌬—⌬(CH₃)—⌬—OCOC(CH₃)=CH₂ |

Thus, in the embodiment, in the alignment films 40, 60, on the first alignment film layer 41, the second alignment film layer 42 that is higher in the alignment properties than the first alignment film is formed along a surface alignment of the first alignment film layer 41. The alignment films 40, 60 are excellent in light and heat stability in addition to exhibiting high alignment properties. Accordingly, the liquid crystal device according to the embodiment can maintain a higher liquid crystal alignment control force (liquid crystal alignment control function) over a long period of time.

The first alignment film layer 41 can be formed also by, with a polyimide film, irradiating a linearly polarized UV light of, for instance, substantially 257 nm vertically onto a substrate thereon the polyimide film is formed. Furthermore, the first alignment film layer can be constituted also of an alignment film (light alignment film) that is obtained by irradiating UV light to a photosensitive polymer film mainly constituted of a photosensitive polymer material. In this case, for instance, the photosensitive polymer film can be constituted of a polyvinyl cynnamate film.

Figure 6:
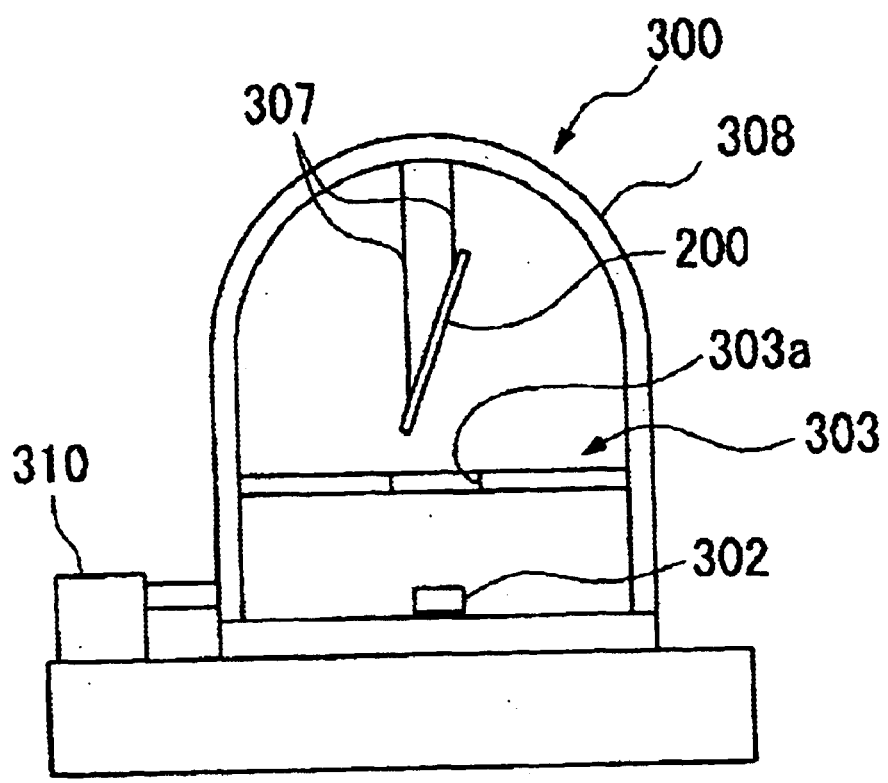
FIG. 6 is a diagram schematically showing a configuration of oblique deposition apparatus.

Furthermore, the first alignment film layer 41 can be constituted of an oblique deposition film of an inorganic material. As the inorganic material, for instance, silicon oxide can be used. A method of forming the oblique deposition film in this case will be explained with reference to FIG 6. FIG. 6 is an explanatory diagram schematically showing an appearance of oblique deposition apparatus 300 that is used in the formation of an oblique deposition film. The deposition apparatus 300 can include a deposition chamber 308 that includes a deposition source 302 that generates a vapor of silicon oxide, a vapor circulation portion 303 provided with an opening 303a there through the vapor of silicon oxide can flow, and a substrate disposition portion 307 where the pre-substrate 200 is disposed with a predetermined angle slanted to the deposition source 302, and a vacuum pump 310 for evacuating the deposition chamber 308. According to the deposition method in this case, when the vacuum pump 310 is first operated, the deposition chamber 308 is evacuated, and when the deposition source 302 is heated with heating means (not shown), the vapor of silicon oxide is generated from the deposition source 302. Subsequently, a vapor stream of silicon oxide generated from the deposition source 302 passes through the opening 303a and is deposited on a surface of the pre-substrate 200 with a predetermined angle (deposition angle). In this case, columnar structures of silicon oxide are aligned in a predetermined direction, and by the columnar structures an alignment control force can be obtained.

Furthermore, the first alignment film layer 41 can be constituted of an alignment film in which a diamond-like carbon (DLC) film is aligned by irradiating an ion beam. In this case, the DLC film is deposited on the pre-substrate 200 by a technique of a CVD method followed by irradiating an ion beam from a direction of 40 degree, and thereby an alignment film (ion beam alignment film) can be obtained. Still furthermore, as the films thereto the ion beam is irradiated, a polyimide film, an inorganic film can be used. Furthermore, a film obtained by use of a directional sputtering can be used as the first alignment film layer 41.

When the first alignment film layer 41, which is constituted of any one of the polyimide film with low rubbing density, the light alignment film of polyimide or photosensitive polymer, the oblique deposition film of inorganic material, or the ion beam alignment film of a polyimide film, an inorganic film or DLC, is used as the alignment film of a liquid crystal device without forming the second alignment film layer 42, while the rubbing defects, such as the rubbing streaks, the peeling of the alignment film is less likely to occur unlike the rubbed alignment film of polyimide, the alignment control force to the liquid crystal molecule becomes weaker in some cases. However, in the embodiment, on a side of a surface of such first alignment film layer 41 that is lower in the alignment control force, the second alignment film layer 42 that is higher in the alignment control force is formed. Accordingly, while suppressing the rubbing defects from occurring, the liquid crystal molecule can be highly controlled in the alignment due to the second alignment film layer 42.

Although, in the embodiment, the alignment films 40 and 60 of both the TFT array substrate 10 and the opposite substrate 20 are formed in the above configuration, it should be understood that the present invention is not restricted to the above. When an alignment film of at least one of the substrates is formed in the above configuration, a liquid crystal device provided with an alignment film excellent in the alignment control force of the liquid crystal molecules can be provided. However, it is needles to say that when the alignment films of both substrates are formed in the above configuration, a liquid crystal device with excellent alignment control force of the liquid crystal molecule can be provided.

In addition, although, in the embodiment, only an active matrix type liquid crystal device with TFT elements is explained, it should be understood that the present invention is not restricted thereto. The invention can be applied also to an active matrix type liquid crystal device and a passive matrix type liquid crystal device that uses TFD (Thin-Film Diode) elements. Furthermore, although, in the embodiment, only a transmissive liquid crystal device is explained, the invention, without restricting thereto, can be applied also to a reflective or a translucent reflection type liquid crystal device. Thus, the invention can be applied to liquid crystal devices of all structures.

Since an ion deposition method is used in the process of forming the second alignment film layer 42 and the polymerization is allowed to proceed on the first alignment film layer 41 using the acryl monomers as the deposition material in the embodiment, the polymer that constitutes the second alignment film layer 42 being formed can be highly polymerized. As a molecular weight of the polymer becomes larger, the alignment properties become higher, and moreover the larger the molecular weight, the more stable with respect to heat and light, Accordingly, when the ion deposition method that uses the acryl monomers as the deposition material is adopted, the second alignment film layer 42 with excellent alignment control force and with excellent light and heat stability can be formed.

As the method of forming the second alignment film layer 42, other than the ion deposition method with the acryl monomers, for instance, an organic polymer can be directly deposited. In this case, when a molecular weight of the organic polymer becomes larger, the deposition thereof becomes more difficult. Accordingly, a molecular weight of a polymer for use is preferable to be several thousands, or specifically 2,000 to 10,000. As such organic polymers, for instance, polystyrene, polyethylene, and fluorine based polymers such as polytetrafluoroethylene (hereinafter abbreviated as "PTFE") can be cited. In particular, fluorine based polymer, being high in the crystallinity, is preferable.

An example of an electronic instrument provided with a liquid crystal device according to the above embodiment for carrying out the invention will be explained.

Figure 8:
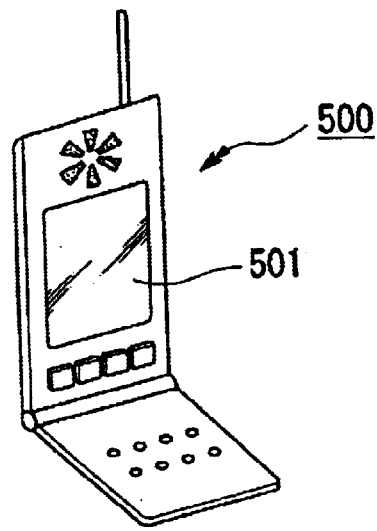
FIGS. 8A, 8B and 8C are perspective views showing some of electronic instruments according to the invention.
Figure 8:
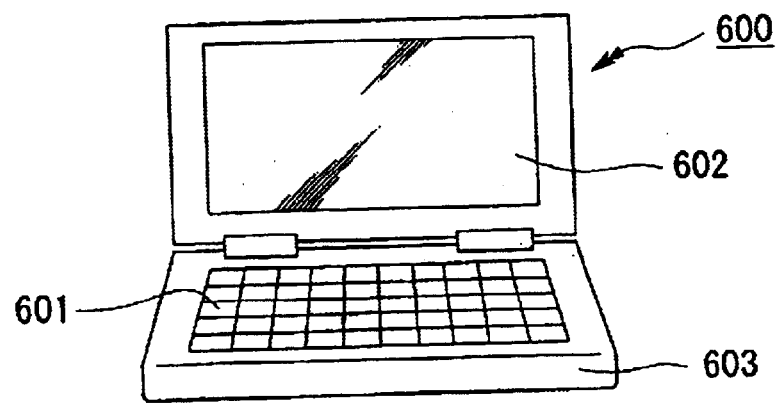
Figure 8:
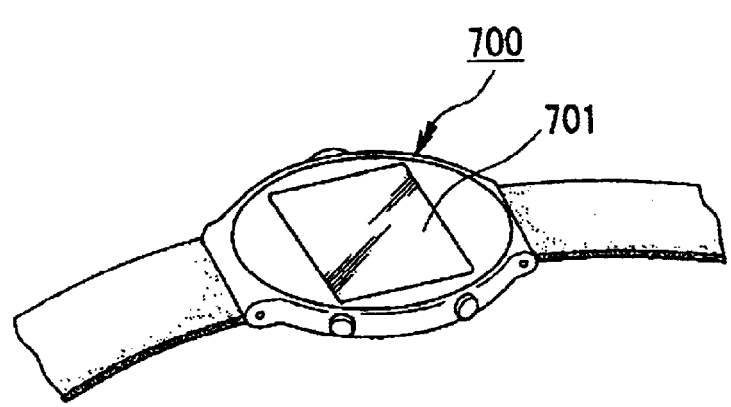

FIG. 8A is a perspective view showing an example of a portable telephone. In FIG. 8A, reference numeral 500 denotes a portable telephone body, and reference numeral 501 denotes a liquid crystal display portion with a liquid crystal device according to the embodiment.

FIG. 8B is a perspective view showing an example of a portable information processor device, such as a word processor or a personal computer. In FIG. 8B, reference numeral 600 denotes an information processor device, reference numeral 601 denotes an input portion such as a keyboard, reference numeral 603 denotes an information processor device body and reference numeral 602 denotes a liquid crystal display portion that employs a liquid crystal device according to the embodiment.

FIG. 8C is a perspective view showing an example of a wrist watch type electronic instrument. In FIG. 8C, reference numeral 700 denotes a watch body, and reference numeral 701 denotes a liquid crystal display portion that employs a liquid crystal device according to the embodiment.

The electronic instruments shown in FIGS. 8A, 8B and 8C are provided with a liquid crystal display portion according to the embodiment. Accordingly, since the alignment control force to the liquid crystal molecules that constitute the liquid crystal layer is high, the disclination based on, for instance, the deficiency of the alignment control force can be prevented or suppressed, and the lowering of the contrast is less likely to occur.

Figure 9:
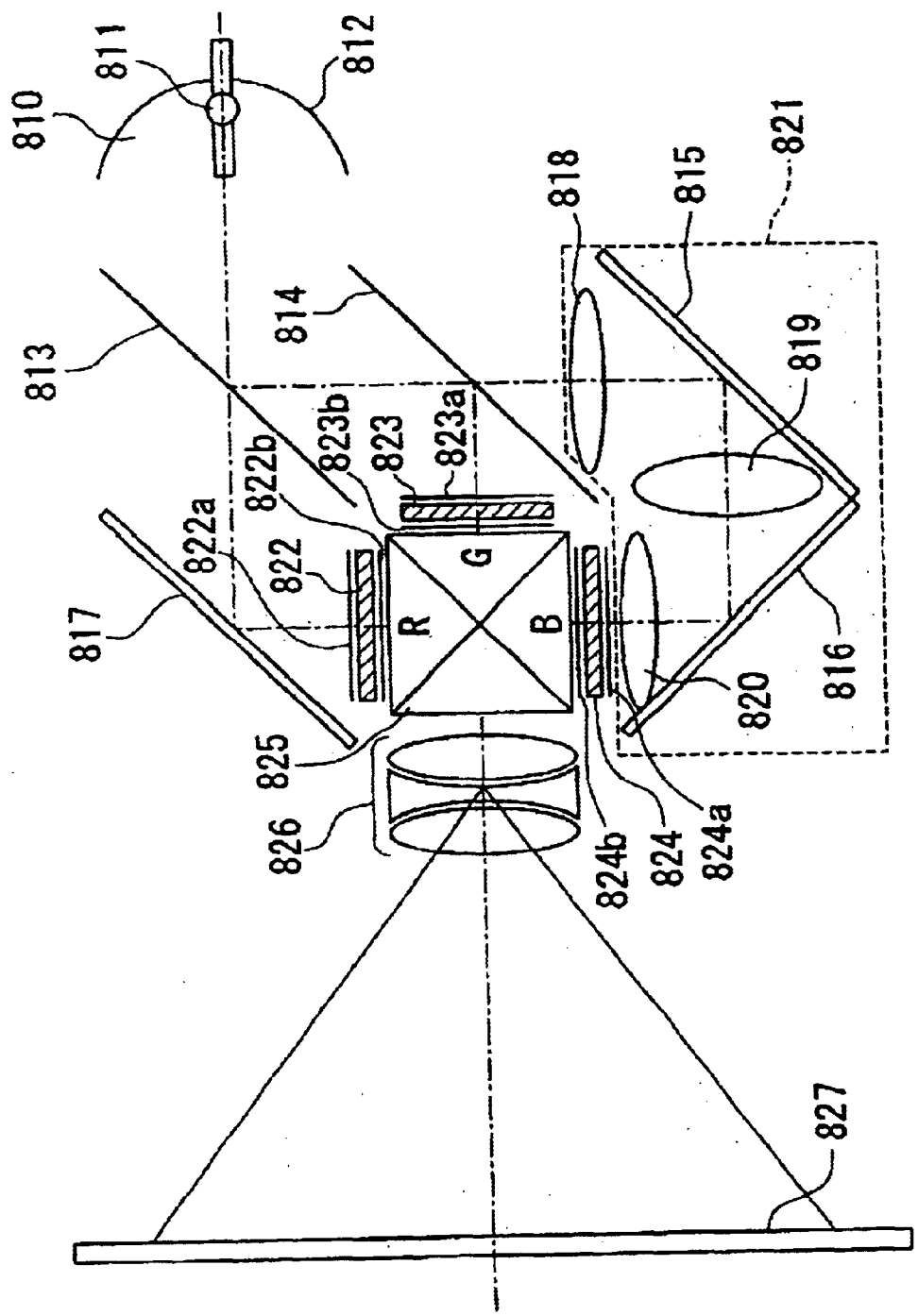
FIG. 9 is a diagram showing one example of a projection type display device according to the invention.

A configuration of a projection type display device that is provided with a liquid crystal device according to the embodiment as a light modulation device will be explained with reference to FIG. 9. FIG. 9 is a schematic block-diagram showing an essential portion of the projection type display device in which a liquid crystal device according to the embodiment is used as a light modulation device. In FIG. 9, reference numeral 810 denotes a light source; reference numerals 813 and 814, dichroic mirrors; reference numerals 815, 816 and 817, reflection mirrors; reference numeral 818, an incidence lens; reference numeral 819, a relay lens; reference numeral 820, an exit lens; reference numerals 822, 823 and 824, liquid crystal light modulators; reference numeral 825, a cross dichroic prism; and reference numeral 826, a projection lens.

The light source 810 can includes a lamp 811, such as a metal halide lamp, and a reflector 812 that reflects light from the lamp. The blue light and green light reflective dichroic mirror 813 allows red light of a light flux from the light source 810 to transmit and reflects the blue light and the green light. The transmitted red light is reflected by the reflection mirror 817 and is allowed to enter a liquid crystal red light modulator 822 that is provided with a liquid crystal device according to the embodiment. Of colored light reflected from the dichroic mirror 813, the green light is reflected by a green light reflective dichroic mirror 814 and allowed to enter a liquid crystal green light modulator 823. The blue light also transmits a second dichroic mirror 814. For the blue light, in order to compensate an optical path difference from that of the green light and the red light, light guide means 821, constituted of a relay lens unit including the incidence lens 818, the relay lens 819 and the exit lens 820, is disposed, and there through the blue light is allowed to enter a liquid crystal blue light modulator 824 provided with a liquid crystal device according to the embodiment. In front and in the rear of each of the liquid crystal red light modulator 822, the liquid crystal green light modulator 823, and the liquid crystal blue light modulator 824, each of incidence side polarizing plates 822*a*, 823*a*, and 824*a*, and each of exit side polarizing plates 822*b*, 823*b* and 824*b* are disposed, respectively. Light control is possible because only the light that has a predetermined vibration direction can exit when passing through the exit side polarizing plate, after the light is linearly polarized by the incidence side polarizing plate and modulated by the liquid crystal light modulator.

Three colored lights that are light controlled by the respective light modulators and two polarizing plates enter the cross dichroic prism 825. In the prism, four right angle prisms are adhered, and inside thereof a dielectric multi-layered film that reflects red light and a dielectric multi-layered film that reflects blue light are formed in cross-shape. By means of the dielectric multi-layered films, the three colored lights are composed, and thereby light that expresses a color image is formed. The composed light is projected on a screen 827 by a projection lens 826 of a projection optical unit with displaying an enlarged image.

A projection type display device having the above structure, being provided with a liquid crystal device according to the embodiment, becomes a display device with high alignment control force to the liquid crystal molecules that constitute the liquid crystal layer and with excellent endurance to light and heat.

In the following, embodiments involving the invention and comparative embodiments will be explained.

In a first comparative embodiment, a polyimide solution can be coated by a technique of spin coat on a glass substrate (pre-substrate) and on an opposite substrate, wherein elements such as electrodes and TFT elements other than an alignment film are formed on the glass substrate (pre-substrate), a solvent is volatilized by the process of pre-bake (80 degree centigrade, 10 min) followed by baking at 180 degree centigrade for 1 hr further followed by forming a polyimide film at a film thickness of approximately 25 nm (being preferable to be 5 to 50 nm, being furthermore preferable to be 15 to 30 nm) and by applying the rubbing with the rubbing density of 200, and thereby a low rubbing density polyimide alignment film is formed.

Two substrates that are provided with thus formed low rubbing density polyimide alignment film are adhered at a cell gap of 5 μm followed by filling in a fluorine-based liquid crystal between the substrates and sealing, and thereby an active matrix type transmissive liquid crystal device is prepared. The two substrates are adhered to each other with alignment directions of 90 degree to each other, and thereby a TN (Twisted Nematic) mode liquid crystal display device is prepared.

In a second comparative embodiment as in comparative embodiment 1, a polyimide solution is coated by technique of spin coat on a glass substrate (pre-substrate) and on an opposite substrate, wherein elements such as electrodes and TFT elements other than an alignment film are formed on the glass substrate (pre-substrate), a solvent is volatilized by the process of pre-bake (80 degree centigrade, 10 min) followed by baking at 180 degree centigrade for 1 hr further followed by forming a polyimide film at a film thickness of approximately 25 nm (being preferable to be 5 to 50 nm, being furthermore preferable to be 15 to 30 nm) and irradiating a linearly polarized UV light of 257 nm vertically to the substrate with the film. In the next, a direction of the polarized light is rotated by 90 degree, and furthermore a direction of irradiation is rotated within a plane containing the direction of polarized light, and a second irradiation is carried out. With two substrates provided with light alignment films formed by light irradiation, as in comparative embodiment 1, a liquid crystal layer is interposed between them, and thereby a TN mode liquid crystal display device is prepared.

In a third comparative embodiment, as in comparative embodiment 1, a polyimide solution can be coated by a technique of spin coat on a glass substrate (pre-substrate) and on an opposite substrate, wherin elements such as electrodes and TFT elements other than an alignment film are formed on the glass substrate (pre-substrate), a solvent is volatilized by the process of pre-bake (80 degree centigrade, 10 min) followed by baking at 180 degree centigrade for 1 hr further followed by forming a polyimide film at a film thickness of approximately 25 nm (being preferable to be 5 to 50 nm, being furthermore preferable to be 15 to 30 nm) and irradiating an argon ion beam onto the substrate with the film at an angle of 15 degree with respect to the substrate at an accelerating voltage of 300 eV. With two substrates provided with alignment films thus formed by ion beam irradiation, as in comparative embodiment 1, a liquid crystal layer is interposed between them, and thereby a TN mode liquid crystal display device is prepared.

In a fourth comparative embodiment, as in comparative embodiment 1, a polyvinyl cynnamate solution can be coated by technique of spin coat on a glass substrate (pre-substrate) and on an opposite substrate, wherein elements such as electrodes and TFT elements other than an alignment film are formed on the glass substrate, a solvent is volatilized by the process of pre-bake (80 degree centigrade, 10 min) further followed by forming a polyvinyl cynnamate film at a film thickness of approximately 25 nm (being preferable to be 5 to 50 nm, being furthermore preferable to be 15 to 30 nm) and irradiating a linearly polarized UV light of 257 nm vertically onto the substrate with the film. With two substrates provided with light alignment films thus formed by light irradiation, as in comparative embodiment 1, a liquid crystal layer is interposed between them, and thereby a TN mode liquid crystal display device is prepared.

In a fifth comparative embodiment, an oblique deposition film of SiO is formed on a glass substrate (pre-substrate) and on an opposite substrate, wherein elements such as electrodes and TFT elements other than an alignment film are formed on the glass substrate (pre-substrate), with the oblique deposition apparatus 300 shown in FIG. 6. Specifically, from a direction inclined by 60 degree from a direction vertical to the substrate, an oblique deposition film of SiO is formed at a film thickness of approximately 20 nm, furthermore thereafter, a direction of a deposition beam is changed by 90 degree, and an oblique deposition film of SiO of a film thickness of approximately 0.3 nm is formed from a direction inclined by 80 degree from a direction vertical to the substrate. With two substrates provided with SiO oblique deposition films like this, as in comparative embodiment 1, a liquid crystal layer is interposed between them, and thereby a TN mode liquid crystal display device is prepared.

In a sixth comparative embodiment, a $SiO_2$ film having a film thickness of approximately 20 nm is formed by deposition or sputtering on a glass substrate (pre-substrate) and on an opposite substrate, wherein elements such as electrodes and TFT elements other than an alignment film are formed on the glass substrate (pre-substrate), and an argon ion beam is irradiated onto the substrate with the film at an angle of 15 degree with respect to the substrate at an accelerating voltage of 300 eV. With two substrates provided with inorganic alignment films thus formed by ion beam irradiation, as in comparative embodiment 1, a liquid crystal layer is interposed between them, and thereby a TN mode liquid crystal display device is prepared.

In a seventh comparative embodiment mirrortron sputtered (directionally sputtered) $SiO_2$ film having a film thickness of approximately 20 nm is formed on a glass substrate (pre-substrate) and on an opposite substrate, wherein elements such as electrodes and TFT elements other than an alignment film are formed on the glass substrate (pre-substrate). With two substrates provided with inorganic alignment films thus formed, as in comparative embodiment 1, a liquid crystal layer is interposed between them, and thereby a TN mode liquid crystal display device is prepared.

In an eighth comparative embodiment, a DLC (diamond-like carbon) film having a film thickness of approximately 10 nm is formed by a technique of a CVD method (chemical vapor deposition method) on a glass substrate (pre-substrate) and on an opposite substrate, wherein elements such as electrodes and TFT elements other than an alignment film are formed on the glass substrate (pre-substrate), and an ion beam is irradiated onto the substrate with the film from a direction of 40 degree with respect to the substrate. With two substrates provided with a DLC alignment film formed by ion beam irradiation to the DLC, as in comparative embodiment 1, a liquid crystal layer is interposed between them, and thereby a IN mode liquid crystal display device is prepared.

In a first embodiment, on a glass substrate (pre-substrate) where elements, such as electrodes and TFT elements other than an alignment film are formed, and on an opposite substrate, each of processes according to the above comparative embodiments 1 through 8 is applied, and thereby eight kinds of pairs of first alignment film layers are formed. Thereafter, as the deposition material, PTFE having a number-average molecular weight of 20,000 is deposited, and thereby a PTFE film (second alignment film) having a film thickness of approximately 50 nm is formed on each of the first alignment film layer. With substrates that are provided with a PTFE deposition film on each of the first alignment films like this, and by pairing substrates having the same kind of the first alignment film, as in comparative embodiment 1, a liquid crystal layer is interposed between paired substrates, and thereby eight kinds of TN mode liquid crystal display devices are prepared.

In a second embodiment, on a glass substrate (pre-substrate) where elements, such as electrodes and TFT elements other than an alignment film are formed, and on an opposite substrate, each of the processes according to comparative embodiments 1 through 8 is applied, and thereby eight kinds of pairs of first alignment film layers are formed. Thereafter, as the deposition material, biphenyl-4,4'-dimethacrylate shown in M34 of the Table 4 is deposited by means of the ion deposition method, and thereby a polymerized second alignment film having a film thickness of approximately 50 nm is formed on each of the first alignment film layers. With substrates that are provided with an ion deposition film on each of the first alignment films like this, and by pairing substrates having the first alignment film of the same kind, as in comparative embodiment 1, a liquid crystal layer is interposed between paired substrates, and thereby eight kinds of TN mode liquid crystal display devices are prepared.

In a third embodiment, on a glass substrate (pre-substrate) where elements such as electrodes and TFT elements other than an alignment film are formed, and on an opposite substrate, each of the processes according to comparative embodiments 1 through 8 is applied, and thereby eight kinds of pairs of first alignment film layers are formed. Thereafter, as the deposition material, polyethylene (PE) having a number average molecular weight of 2000 is deposited, and thereby a PE film (the second alignment film) having a film thickness of approximately 50 nm is formed on each of the first alignment film layers. With substrates that are provided with a PE deposition film on each of the first alignment film, and by pairing substrates having the same kind of the first alignment film, as in comparative embodiment 1, a liquid crystal layer is interposed between paired substrates, and thereby eight kinds of TN mode liquid crystal display devices are prepared.

The display characteristics are observed for each of the liquid crystal display devices obtained according to Embodiments 1 through 3 and Comparative embodiments 1 through 8. As a result, the display characteristics of the respective liquid crystal display devices obtained according to Embodiments 1 through 3 are confirmed to be improved in the contrast in comparison with the liquid crystal display devices obtained according to Comparative embodiments 1 through 8, and thereby it is found that the alignment films according to Embodiments 1 through 3 have a sufficient liquid crystal alignment control function.

The surface alignment properties (anisotropy) are observed with a polarizing microscope for each of the alignment films in which the second alignment film layer is formed on each of the first alignment film layers according to Embodiments 1 through 3, and for the alignment films having configurations formed according to comparative examples 1 through 8. As a result, it is confirmed that the alignment films obtained according to Embodiments 1 through 3 are more uniform in the anisotropy in comparison with the alignment films obtained according to Comparative embodiments 1 through 8.

The endurance test of the liquid crystal display devices obtained according to the Embodiments 1 through 3 and the comparative examples 1 through 8 is carried out. That is, when the liquid crystal display device obtained according to each of the Embodiments 1 through 3 and the comparative examples 1 through 8 is subjected to visible light irradiation of a flux density of 40 lm/mm$^2$ under a temperature of 60 degree centigrade, relationship between an applied voltage (V) and light transmittance (T), that is, a V/T time curve is measured, and an endurance period of time, that is, the time when the light transmittance changes largely with an low applied voltage and the V/T curve changes largely, is measured. As a result, it is found that the endurance periods of time of the liquid crystal display devices obtained according to Embodiments 1 through 3, respectively, are approximately twice the endurance periods of time of the liquid crystal display devices obtained according to comparative examples 1 through 8, and by forming the second alignment film on the first alignment film (in particular, a polymer film such as a polyimide film), the endurance of the alignment film can be largely improved.

As explained above, according to the invention, an alignment film provided with a high alignment control force to a target molecule such as a liquid crystal molecule can be provided. Furthermore, in an alignment film of the invention, since a process for endowing an alignment control force can be applied to the film itself under a moderate condition, defects such as causing deterioration of the film are less likely to occur at the time of forming the alignment film. Accordingly, an alignment film with less defects and high reliability can be obtained. Furthermore, when the alignment film according to the invention is provided, a liquid crystal device that is high in the alignment properties of the liquid crystal and less likely to cause the contrast degradation can be provided. Still furthermore, when the liquid crystal device of the invention is provided, a projection type display device with excellent display characteristics can be provided. The liquid crystal device thereto the alignment film of the invention can be applied is not restricted to the liquid crystal device that uses the polarizing plate, but can also be applied to liquid crystal devices, in which, for instance, a polymer is dispersed in a liquid crystal molecule. That is, the alignment film according to the invention can be widely applied to the liquid crystal device in which a target molecule (in the embodiment, a liquid crystal molecule is cited) is necessary to be aligned.

What is claimed is:

1. An alignment film comprising:
   a first alignment film; and
   a second alignment film formed on a surface of the first alignment film that is capable of controlling alignment of target molecules, the first alignment film having in-plane anisotropy in a film surface direction and being relatively non-uniform in a direction of the anisotropy compared to the second alignment film, the second alignment film having in-plane anisotropy in a film surface direction, being relatively uniform in a direction of the anisotropy, more so than the first alignment film, and substantially controlling the alignment of the target molecules.

2. The alignment film as set forth in claim 1, the first alignment film being a polyimide alignment film that is formed mainly of polyimide and having a rubbing density of 200 or less.

3. The alignment film as set forth in claim 1, the first alignment film being a polyimide alignment film that is mainly made of polyimide and in which the anisotropy is given by irradiating UV light.

4. The alignment film as set forth in claim 1, the first alignment film is a polyimide alignment film that is mainly made of polyimide and in which the anisotropy is given by ion beam irradiation.

5. The alignment film as set forth in claim 1, the first alignment film a photosensitive polymer alignment film that is mainly made of a photosensitive polymer material and in which the anisotropy is given by UV light irradiation.

6. The alignment film as set forth in claim 1, the first alignment film being an oblique deposition film mainly made of silicon oxide.

7. The alignment film as set forth in claim 1, the first alignment film being a thin inorganic alignment film whose anisotropy is given by ion beam irradiation.

8. The alignment film as set forth in claim 1, the first alignment film being a thin inorganic alignment film whose anisotropy is given by directional sputtering.

9. The alignment film as set forth in claim 1, the first alignment film being mainly made of diamond-like carbon.

10. The alignment film as set forth in claim 1, the second alignment film being an organic deposition film that is deposited on the first alignment film by a technique of a deposition method.

11. The alignment film as set forth in claim 1, the second alignment film being mainly made of a crystalline fluorine containing polymer.

12. The alignment film as set forth in claim 1, the second alignment film is mainly made of polyolefin.

13. The alignment film as set forth in claim 1, the second alignment film being mainly made of polymers that are derived from liquid crystalline monomers by polymerizing the liquid crystalline monomers.

14. The alignment film as set forth in claim 13, the liquid crystalline monomer being mainly made of one or a plurality of kinds of compounds expressed by any one of the following general formulas (1), (2) and (3),

[Chemical formula 1]

$$CH_2=CHCOO-X_1-Y \quad (1)$$

In the formula, $X_1$ denotes any one of

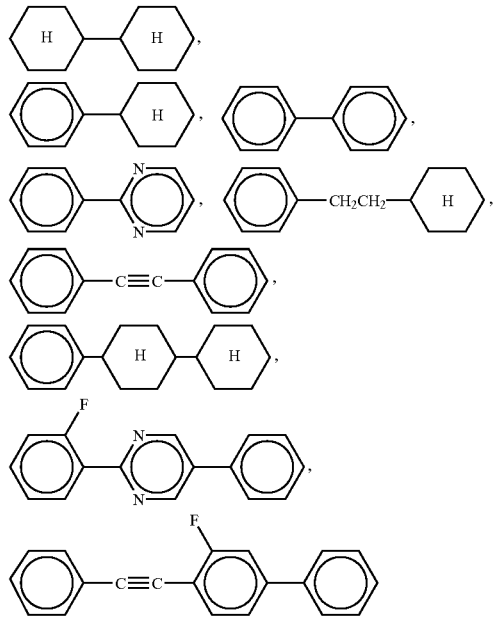

(1)

$Y_1$ denotes a group expressed with an alkyle group and a general formula COOR (R denotes an alkyl group), and a group in which at least one hydrogen atom of a benzene ring is substituted with a halogen atom),

[Chemical formula 2]

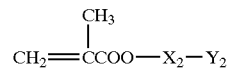

$$CH_2=\overset{CH_3}{\underset{|}{C}}COO-X_2-Y_2 \quad (2)$$

In the formula (2), $X_2$ denotes

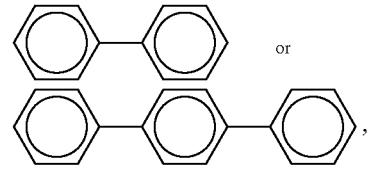

or one in which at least one hydrogen atom of at least one benzene ring that constitutes these is substituted with a halogen atom. $Y_2$ denotes any one of a hydrogen atom, a methyl group, a cyano group, and a group that is expressed with general formulas R and OR (R denotes an alkyl group)),

[Chemical formula 3]

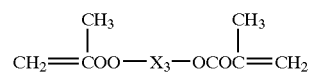

$$CH_2=\overset{CH_3}{\underset{|}{C}}OO-X_3-OCO\overset{CH_3}{\underset{|}{C}}=CH_2 \quad (3)$$

In the formula (3), $X_3$ denotes

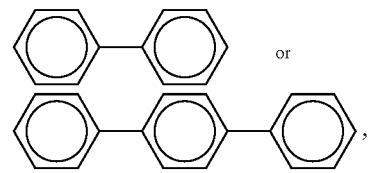

or one in which at least one hydrogen atom of at least one benzene ring that constitutes these is substituted with a halogen atom or a methyl group).

15. The alignment film as set forth in claim 1, the second alignment film being mainly made of polyalkylacrylates or polyalkylmethacrylates.

16. A method of fabricating an alignment film, comprising:
forming a first alignment film; and
forming a second alignment film on a surface of the first alignment film that is capable of controlling alignment of target molecules, the first alignment film having in-plane anisotropy in a film surface direction and being relatively non-uniform in a direction of the anisotropy compared to the second alignment film, the second alignment film having in-plane anisotropy in a film surface direction being relatively uniform in a direction of the anisotropy, more so than the first alignment film, and substantially controlling the alignment of the target molecules, the second alignment film being formed by a technique of a deposition method with an organic material.

17. A method of fabricating an alignment film as set forth in claim 16:
wherein in the forming the second alignment film, the second alignment film is formed by a technique of an ion deposition method with liquid crystalline monomers as the organic material.

18. A liquid crystal device having a configuration in which a liquid crystal layer is interposed between two substrates disposed apposite to each other, comprising:

an alignment film disposed on an outermost surface on the liquid crystal layer side of at least one substrate, the alignment film comprising:
a first alignment film; and
a second alignment film formed on a surface of the first alignment film that is capable of controlling alignment of target molecules, the first alignment film having in-plane anisotropy in a film surface direction and being relatively non-uniform in a direction of the anisotropy compared to the second alignment film, the second alignment film having in-plane anisotropy in a film surface direction, being relatively uniform in a direction of the anisotropy, more so than the first alignment film, and substantially controlling the alignment of the target molecules.

19. A projection type display device, comprising:

a light source;

a light modulation device comprised of the liquid crystal device that is set forth in claim 18 and modulates light from the light source; and a projection device that projects the light modulated by the light modulation device.

* * * * *